(12) United States Patent
Aviv et al.

(10) Patent No.: US 9,641,603 B2
(45) Date of Patent: May 2, 2017

(54) METHOD AND SYSTEM FOR SPOOLING DIAMETER TRANSACTIONS

(71) Applicant: RADWARE, LTD., Tel Aviv (IL)

(72) Inventors: David Aviv, Tel Aviv (IL); Emanuel Blander, Nordia (IL)

(73) Assignee: Radware, Ltd., Tel Aviv (IL)

( * ) Notice: Subject to any disclaimer, the term of this patent is extended or adjusted under 35 U.S.C. 154(b) by 312 days.

(21) Appl. No.: 13/731,426

(22) Filed: Dec. 31, 2012

(65) Prior Publication Data
US 2014/0189151 A1   Jul. 3, 2014

(51) Int. Cl.
| | |
|---|---|
| G06F 15/16 | (2006.01) |
| G06F 15/167 | (2006.01) |
| G06F 15/173 | (2006.01) |
| H04L 29/08 | (2006.01) |

(52) U.S. Cl.
CPC ...... H04L 67/1004 (2013.01); H04L 67/1025 (2013.01)

(58) Field of Classification Search
CPC ........... H04L 29/5602; H04L 29/12245; H04L 29/06; H04L 47/10; H04L 47/29; H04L 47/30; H04L 47/232; H04L 47/326; H04L 63/08; H04L 63/16; H04L 63/164; H04L 63/165; H04L 63/0428
USPC ........................................ 709/213, 224, 233
See application file for complete search history.

(56) References Cited

U.S. PATENT DOCUMENTS

| | | | |
|---|---|---|---|
| 7,162,513 B1* | 1/2007 | Kister | G06Q 10/107 709/203 |
| 8,576,850 B2* | 11/2013 | Nishimura | 370/394 |
| 2007/0136484 A1* | 6/2007 | Kuninsky | 709/230 |
| 2009/0059941 A1* | 3/2009 | Callaway et al. | 370/412 |
| 2009/0083861 A1* | 3/2009 | Jones | G06F 9/505 726/29 |
| 2010/0299451 A1* | 11/2010 | Yigang | H04L 45/306 709/241 |
| 2010/0332696 A1* | 12/2010 | Muppirala | G06F 13/1642 710/39 |
| 2011/0040845 A1* | 2/2011 | Cai et al. | 709/206 |
| 2011/0202613 A1* | 8/2011 | Craig | H04L 63/0892 709/206 |
| 2012/0131639 A1* | 5/2012 | Alex | H04L 63/0892 726/3 |
| 2013/0039176 A1* | 2/2013 | Kanode et al. | 370/230 |
| 2013/0155853 A1* | 6/2013 | Chen et al. | 370/230 |

* cited by examiner

Primary Examiner — Farzana Huq
(74) Attorney, Agent, or Firm — M&B IP Analysts, LLC

(57) ABSTRACT

A method for spooling diameter transactions is provided. The method comprises receiving from a Diameter client a Diameter request message; determining based in part on a type of the received request message if the received request message should be spooled; determining if a current transaction rate exceeds a predefined spooling threshold, if the received request message should be spooled; and queuing the received request message if the current transaction rate exceeds the spooling threshold.

28 Claims, 7 Drawing Sheets

METHOD AND SYSTEM FOR SPOOLING DIAMETER TRANSACTIONS

TECHNICAL FIELD

The present invention relates generally to a Diameter protocol, and more particularly to providing spooling techniques to control the transaction rate of Diameter transactions processed by Diameter servers.

BACKGROUND

Authentication, authorization and accounting (AAA) functions refer to the functions of processing authentication, authorization and accounting of subscribers. AAA functions are often required when a subscriber wants to receive a predetermined service through a network. One technique discussed in the related art for providing AAA functions is through a remote access dial-in user service (RADIUS) protocol. However, the RADIUS protocol suffers from many disadvantages including scalability, supporting a large number of subscribers that each require server-based authentication, and lack of ability to fulfill the requirements of new technologies, such as wireless networks, mobile internet protocols (IPs) and the others.

To overcome these disadvantages, another type of AAA protocol, known as a Diameter protocol, has been defined. The Diameter protocol is an extensible peer-based AAA protocol that provides AAA functions for conventional technologies as well as new technologies. The Diameter is designed as a peer-to-peer architecture, where every network node that implements the Diameter protocol can act as either a client or a server depending on the network deployment.

The deployment of a typical Diameter protocol is illustrated in FIG. 1. Diameter messages are exchanged between a Diameter client 110 and a Diameter server 120. The Diameter client 110 is a device at the edge of the network that performs access control including, for example, a network access server (NAS) or a foreign agent (FA). The Diameter client 110 generates Diameter requests for authentication, authorization, and/or accounting of subscribers. The Diameter server 120 performs authentication and/or authorization of subscribers according to requests generated by the Diameter client 110.

In order to allow communication between the Diameter client 110 and server 120, a connection is first established between them, where the client and server are exchanging capabilities. Then the client and server communicate through messages; these messages may be part of multi-message sessions. A Diameter message is the base unit for sending a command or delivering a notification to other Diameter nodes. For differing purposes, the Diameter protocol has defined several types of Diameter messages, which are identified by their command code. For example, a Diameter connection is typically established by exchanging Capability-Exchange-Request (CER) and Capabilities-Exchanging-Answer (CEA) messages between the client 110 and server 120. To close a Diameter connection, the client 110 and server 120 exchange disconnection messages, such as a Disconnect-Peer-Request (DPR). Generally, Diameter messages sent by the Diameter client 210 are "request messages" and Diameter messages sent by the Diameter server 220 are "answer messages".

Generally, a session is a logical connection between two Diameter nodes and refers to the interactions between a Diameter client 110 and a Diameter server 120 in a given period of time. A session is associated with a client-generated session identification (ID) number that is globally and eternally unique. The session-ID is used to identify a particular session during further communication. The Diameter client 110 and server 120 communicate over a transport protocol, such as a transmission control protocol (TCP) or a stream control transmission protocol (SCTP).

The Diameter protocol is not bound to a specific application that can utilize the protocol, but rather provides a platform for message exchanging features. For example, as the authentication and authorization mechanisms vary among applications, the Diameter protocol does not define command codes for authentication and authorization purposes. In contrast, the behavior and message to be exchanged for accounting are clearly defined. Accounting as defined in the Diameter protocol requires the device that generates accounting records to follow the direction of an authorization server. In addition, unlike authentication and authorization, accounting applications are not real-time applications. That is, an authorization request should be served immediately, but that may not be the case for an accounting request generated by a billing server.

As network providers continue to increase their services, reliability, scalability and availability become increasingly important. High availability solutions are required to enable subscribers to use the network services and to bill subscribers for using such services during peak-load periods or during device maintenance or failure. Currently, network providers try to meet growing demand for AAA services, and Diameter services in particular, by adding more hardware in the form of Diameter servers and network devices. However, this is an inefficient and costly approach.

That is, there is a need for an efficient solution that enables the continued and reliable operating of Diameter services and functions even during peak-load periods, device maintenance, or device failures.

SUMMARY

Certain embodiments disclosed herein include a method for spooling Diameter transactions. The method comprises receiving from a Diameter client a Diameter request message; determining based in part on a type of the received request message if the received request message should be spooled; determining if a current transaction rate exceeds a predefined spooling threshold, if the received request message should be spooled; and queuing the received request message if the current transaction rate exceeds the spooling threshold.

Certain embodiments disclosed herein a proxy for spooling Diameter transactions. The proxy comprises a counter for measuring a current transaction rate; a short-term queue; a long-term queue; and a controller configured to receive from a Diameter client a Diameter request message, determine based in part on a type of the received request message if the received request message should be spooled, check a value of the counter against a spooling threshold, if the received request message should be spooled, and queue the received request message either in the short-time queue or the long-term queue based upon the check of the value of the counter against the spooling threshold.

Certain embodiments disclosed herein also include an authentication, authorization and accounting (AAA) system. The AAA system comprises: at least one cluster of Diameter servers, wherein each Diameter server is configured to perform authentication, authorization and accounting functions according to the Diameter request messages received from a Diameter client; and a load balancer including a Diameter proxy and configured to distribute Diameter request messages among a plurality of Diameter servers in the cluster of Diameter servers, wherein the Diameter proxy is configured to spool Diameter transactions exchanged between the at least one cluster of Diameter servers and the Diameter client, wherein the Diameter request messages are received at the load balance at a rate that does not exceed a predefined spooling threshold.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

Figure 1:
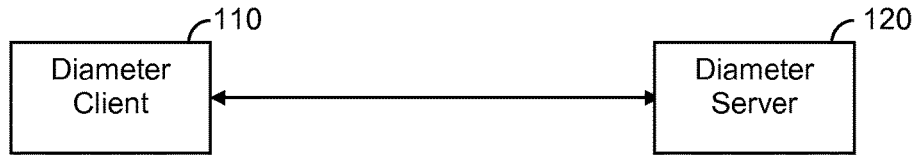
FIG. 1 illustrates the deployment of a Diameter protocol.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality in the drawings; like numerals refer to like parts through several views.

Figure 2:
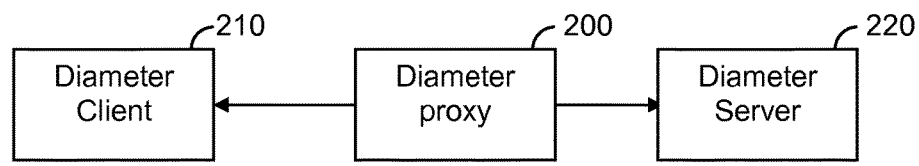
FIG. 2 illustrates the deployment of the Diameter proxy according to one embodiment disclosed herein.

FIG. 2 shows an exemplary and non-limiting diagram of a deployment of a Diameter proxy 200 according to one embodiment disclosed herein. The Diameter proxy 200 is installed in the line of traffic between a Diameter client 210 and a Diameter server 220. The Diameter proxy 200 is designed to enable spooling of Diameter request messages to control the number of Diameter transactions processed, at any given moment, by the Diameter server 220.

According to one embodiment, the spooling is performed on request messages generated by non real-time applications. A non real-time application is an application in which the Diameter messages are exchanged between the Diameter server 220 and client 210 and does not affect, in real time, the requested service. A non-limiting example for a non real-time application is a charging application. For example, if a client sends an SMS to vote for a favorite pop star, the vote should be counted in real-time, however, the associated transaction fees for such a SMS can be charged at a later time. For the sake of simplicity and without limiting the scope of the invention, the various embodiments will be described herein with reference to a charging application. However, it should be noted that any non real-time application that utilizes the Diameter protocol can be utilized for this purpose. Furthermore, according to another embodiment, applications that can tolerate delayed answer messages to the Diameter request messages may also be supported by the Diameter proxy 200.

According to certain embodiments, the Diameter proxy 200 can handle two types of Diameter transactions: event based and session based. Event based Diameter transactions are exchanged between the Diameter client 210 and the Diameter server 220 as isolated transactions. Session based events Diameter messages are exchanged between the Diameter client 210 and server 220 as transactions that are associated to a particular Diameter session.

Typically, in an event based charging, the Diameter client 210 generates and sends an accounting request (ACR) message that includes an event record. The event record contains usage information for services provided to a user (e.g., a "voting SMS") by the service provider. The Diameter client 210 sends the request to the Diameter server 220, which processes the ACR and its event record, and in response, returns an accounting answer (ACA) message acknowledging that the ACR was processed. A pair of ACR and ACA is a single transaction.

According to the various exemplary embodiments, the Diameter proxy 200 spools the ACR messages in order to control the rate in which such messages are processed by the Diameter server 220. With this aim, a transmission rate, either defined in terms of transactions per time interval and/or bandwidth per time interval, (which dictates the transmission rate from the client 210 to the server 220) is set. This parameter may be set by a system administrator or configured by the Diameter proxy 200.

Figure 3:
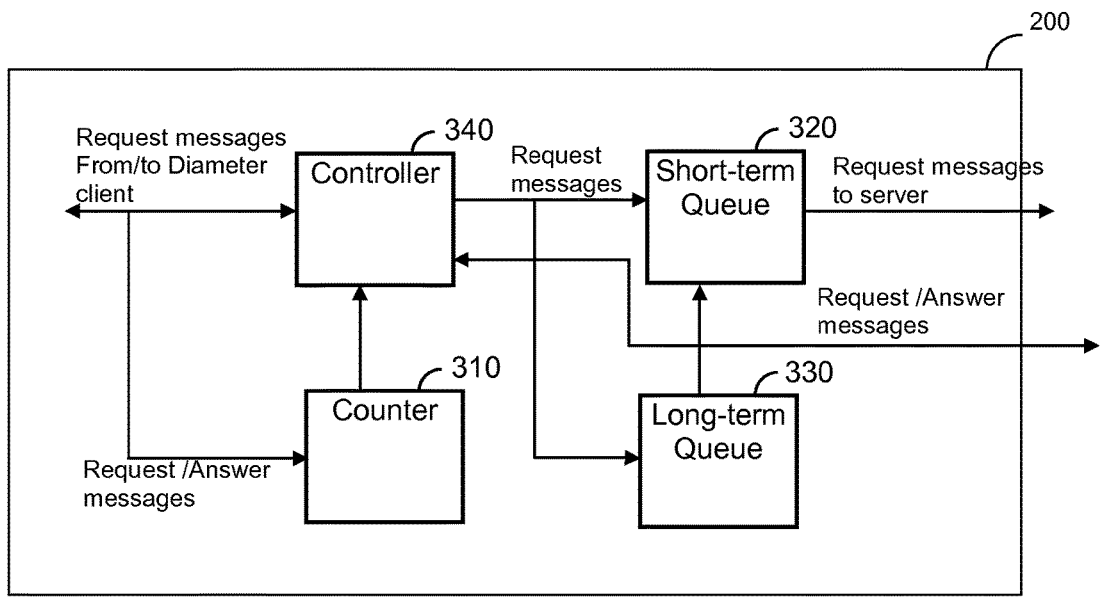
FIG. 3 is a block diagram of the Diameter proxy in accordance with one embodiment.

As illustrated in FIG. 3, the Diameter proxy 200 includes a counter 310, a short-term message queue 320, a long-term message queue 330, and a controller 340 that controls the operation of the proxy 200. The counter 310 and controller 340 receive both request messages (from the client 210) and answer messages (from the server 220). The counter 310 measures the rate of transactions sent to the server during a predefined time interval. That is, the counter 310 measures the number of transactions sent during the predefined time interval. The counter 310 is reset at the end of each predefined time interval. In an exemplary embodiment, the predefined time interval is set to one second, but this value is configurable.

The size of each of the queues 320 and 330 is configurable, and typically the size of queue 330 is bigger than the short-term queue 320. In one embodiment, the size of the short-term queue 320 is determined based on the maximum or current allowed transaction rate. Each of the queues 320 and 330 may be implemented in any form of tangible volatile or non-volatile memory. In a preferred embodiment, the short-term message queue 320 may be, for example, DRAM, SRAM, and the like. The long-term queue 330 may be a storage device realized by means of a solid state disk or device (SSD), and the like.

In one embodiment, the controller 340 compares the value of the counter 310 to a predefined spooling threshold. The spooling threshold defines the rate of Diameter transactions that require message spooling. The spooling threshold may be set by a user (e.g., a system administrator) as part of the configuration process of the Diameter proxy 200. The spooling threshold may be set to different values for different times of the day, days of the week, etc. or when special events are expected (e.g., broadcasting of a popular TV show that promotes the user to vote using SMS messages). The controller 340 checks the value of the counter 310 and if a message has been received from the client 210, and periodically checks to determine if the transaction rate has been changed.

The controller 340 determines based, in part, on the type of the request message and/or the value of the counter 310, if spooling should be performed. If spooling is not required, the request messages are sent directly to the server. The controller 340 also determines to which queue the received messages should be stored. In one embodiment, request messages received from the Diameter client 210 are first placed in the short-term message queue 320, and once the short-term queue 320 is filled-up, incoming messages are saved in the long-term message queue 330. In another embodiment, the decision as to which queue to direct an incoming message is made based, in part, of the type of the message, contents of the event record, and/or its destination sever. This can be utilized to implement a priority-like mechanism.

In one embodiment, the priority mechanism is realized through a plurality of short-term queues. The decision to queue a received message is based not only on the threshold but also on a priority. The priority is determined based on, for example, the type of the message performed by means of a classification engine (not shown). Furthermore, different short-term spooling thresholds can be set to for the different short-term queues and a threshold for all the queues. If a higher priority message arrives and all the short-term queues are full, a lower priority message would be demoted to either a lower priority short-term queue or to the long-term queue. In an exemplary embodiment, a message can be assigned with a "never queued" priority, which means that such a message will be sent directly to the server and will never be queued.

Figure 4A:
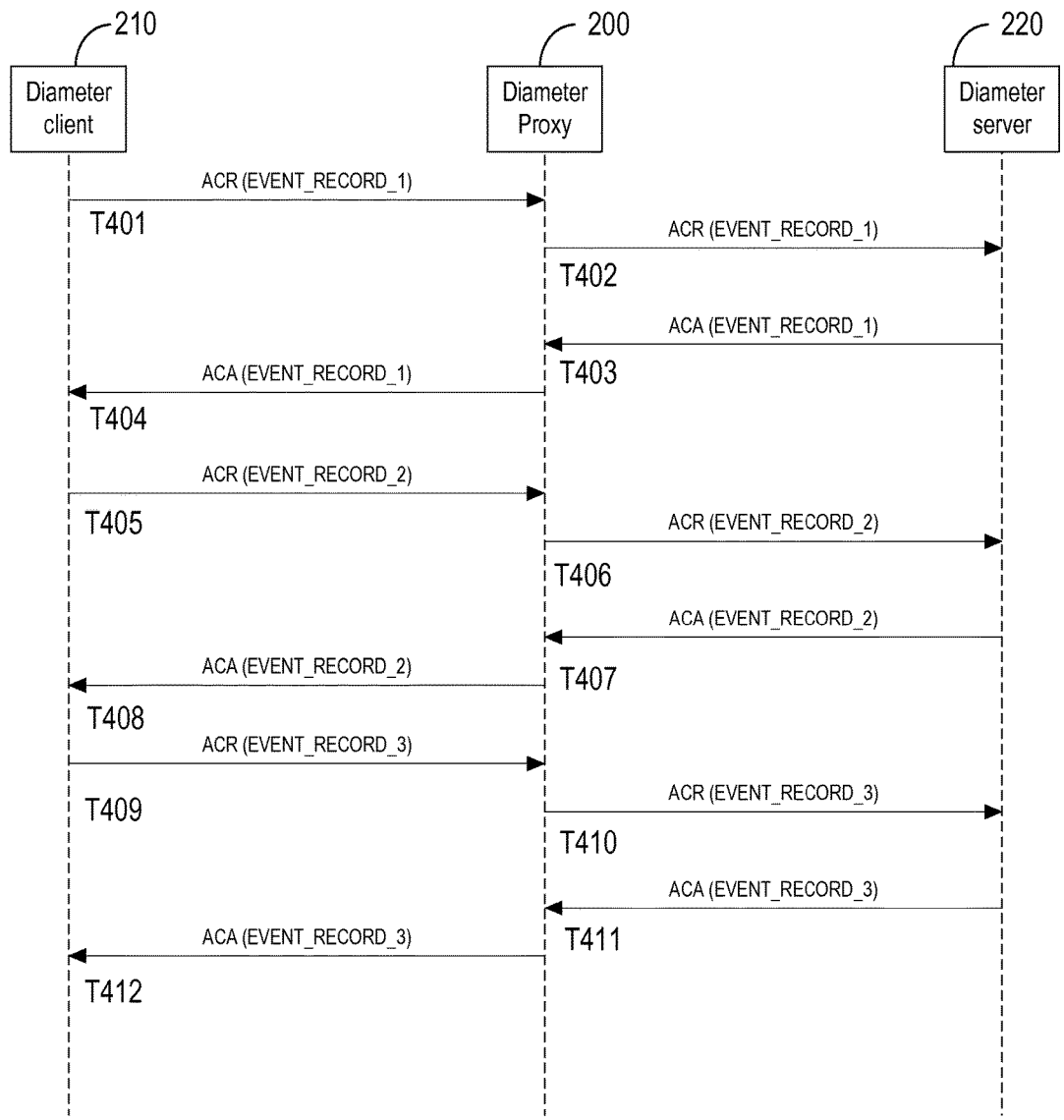
FIG. 4A illustrates an operation of the Diameter proxy when no spooling is required according to an exemplary embodiment.

The operation of the Diameter proxy 200 for handling event-based messages is described with reference to exemplary and non-limiting FIGS. 4A, 4B, and 4C. FIG. 4A shows the operation of the Diameter proxy 200 in a case where the transmission rate of messages is below the spooling threshold, thus spooling is not required.

The Diameter proxy 200 receives ACR messages at times T401, T405, and T409. Each time that an ACR message is received, the Diameter proxy 200 compares the value of the counter 310 to the spooling threshold. In the case illustrated in FIG. 4A, the value of the counter 310 is below the spooling threshold, thus each incoming ACR is immediately relayed, at times T402, T406, and T410, to the Diameter server 220. Answer messages, e.g., ACA messages received from the Diameter server 220 are sent to the Diameter client 210 through the Diameter proxy 200. This can be shown, for example, at T403 and T404 where an ACA message corresponds to an ACR message with a record_1 is forwarded to the client 210.

Figure 4B:
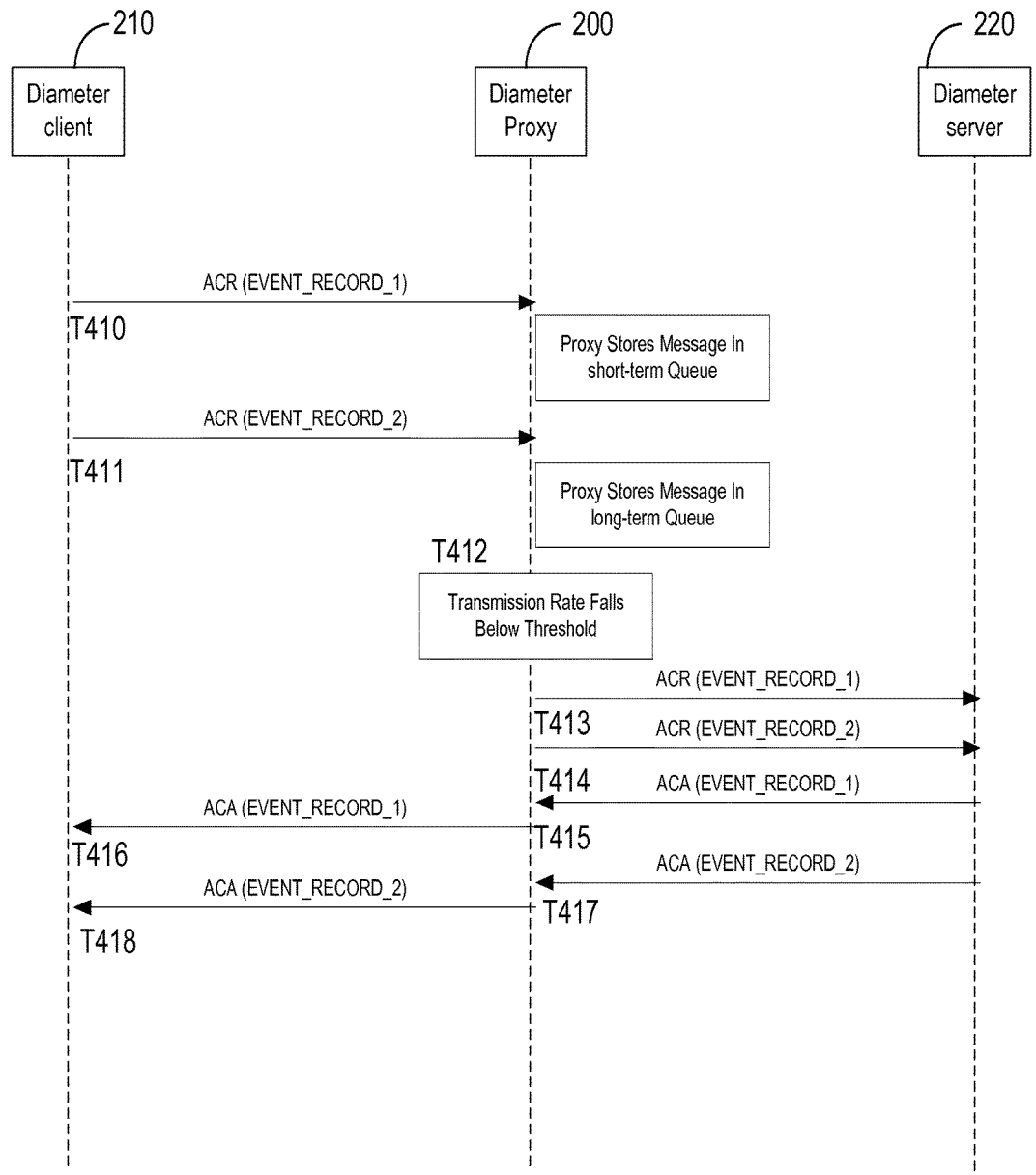
FIG. 4B illustrates an operation of the Diameter proxy when spooling is required to according to an exemplary embodiment.

FIG. 4B shows the operation of the proxy 200 in a case where the transmission rate of Diameter transactions is above the spooling threshold. In this case, incoming ACR messages (e.g., at T410 and T411) are saved in the short-term message queue 320. At time T412, the transmission rate (i.e., number of transactions per minute) falls below the spooling threshold. Thereafter, the proxy 200 sends (at T413 and T414) the queued ACR messages to the Diameter server 220. The Diameter server 220 processes the ACR messages and replies back to the client 210 by generating an ACA message respective of each received ACR message. At T415 and T417, the generated ACA messages are relayed to the client 210 through the proxy 200, which forwards them, at T416 and T418, to the client 210. It should be noted that once the transaction rate falls below the spooling threshold the short-term queue 320 is being emptied. Thus, if a during a certain time interval messages are queued, as a result in the subsequent time interval the transaction rate would fall below the threshold, thereby causing the messages in the queue 320 to be sent to the server. This ensures that when a burst of messages are received, the queue 320 is filled with the messages, and once the burst is over the queue is emptied.

Figure 4C:
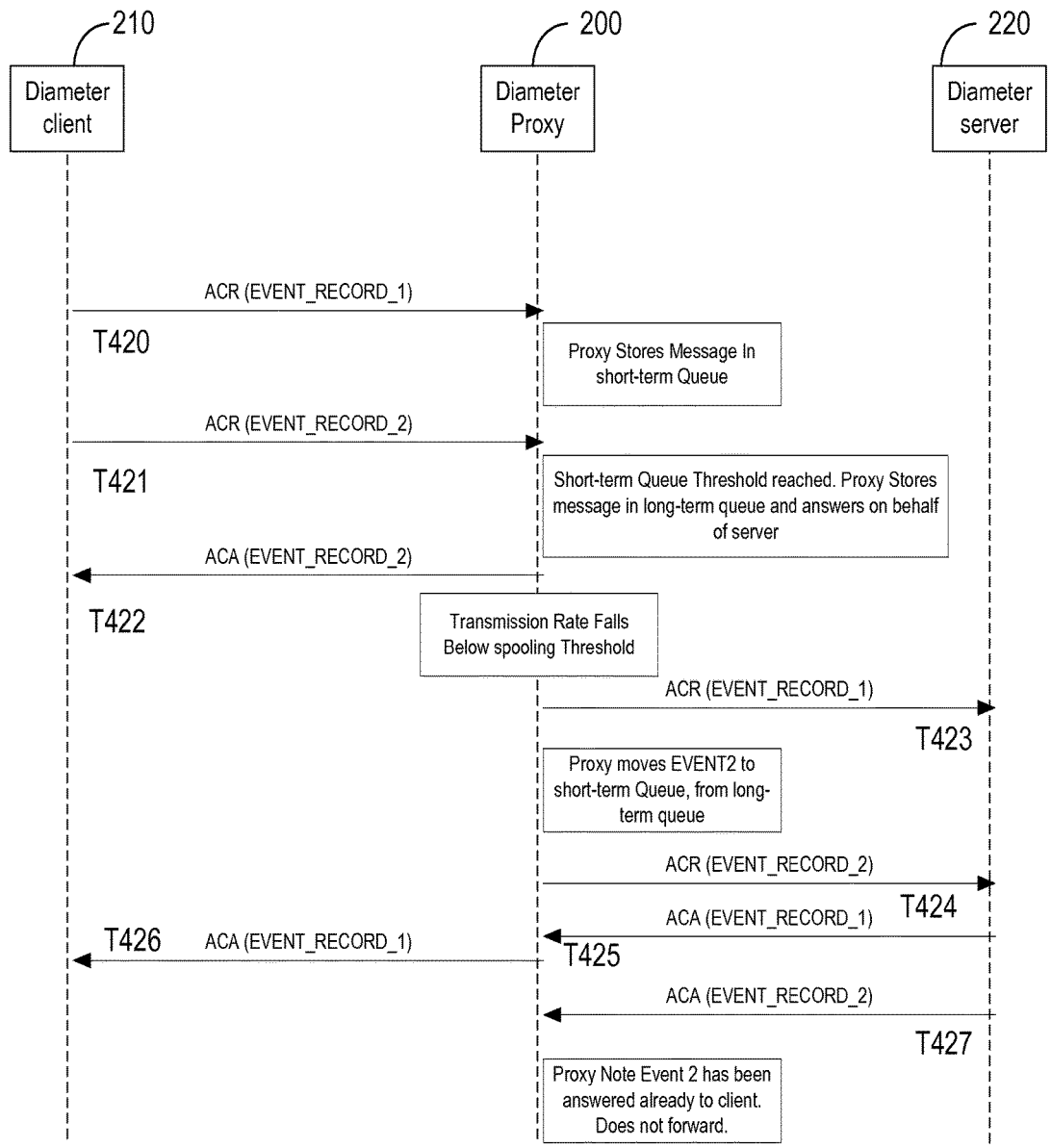
FIG. 4C illustrates an operation of the Diameter proxy when no spooling is required and a short-term queue is full according to an exemplary embodiment.

FIG. 4C shows the operation of the proxy 200 in a case where the transmission rate of messages is above the spooling threshold and the short-term messages queue 320 is filled-up. In this case, in T420, a first ACR message is received at the proxy 200 and saved in the short-term queue. It is assumed that the short-term message queue 320 is full after adding this message. As a result, ACR messages received thereafter at the Diameter proxy 200 are stored in the long-term message queue 330. For example, the ARR message (EVENT_RECORD_2) received at T421 is placed in the queue 330. For each message saved in the long-term queue 330, the Diameter proxy 200 generates and responds with its own ACA message. According to one embodiment, the Diameter proxy 200 is configured with the settings of the Diameter server 220, thereby enabling the proxy 200 to respond on behalf of the server 220. For example, a response generated by the proxy 200 may be an ACK message acknowledging the receipt of a client message. The proxy 200 also saves the ID of each ACR message to which the ACA was generated. For example, at T422, an ACA message generated by the proxy 200 is sent to the Diameter client 210.

Once the transmission rate has fallen below the spooling threshold, the queued messages are sent to the Diameter server 220 (at T423 and T424). It should be noted that messages queued in the long-term queue are first moved to the short-term queue 320, and then are sent to the server 220, for example, according to their order in the queue 320. In one embodiment, for each message released from the short-term queue 320, a message from the long-term queue 330 is placed in the queue 320.

The proxy 200 receives at T425 and T427, ACA messages from the Diameter server 220. However, only the ACA message respective of the ACR message (with record_1), is sent, at T426, to the client 210, as the second ACR message (record_2) was already acknowledged. That is, answer messages that we were already handled by the proxy 200 are dropped and not forwarded to the Diameter client 210.

As noted above, the Diameter proxy 200 can be utilized to spool messages related to session-based charging. A session-based charging is the process of reporting usage reports for a measurable period of time. With this aim, the Diameter protocol defines START, INTERIM, and STOP messages are used to mark the start, update, and end of a session. During a session, a network element may transmit multiple ACR INTERIM messages depending on the proceeding of the session. Typically, a session-based charging transaction starts with an ACR START message (an ACR that includes a START record) initiated by a Diameter client and sent to the server. Thereafter, multiple ACR INTERIM and ACA INTERIM can be exchanged between the Diameter client and server. The session-based charging is closed when the Diameter client and server exchanged ACR and ACA STOP messages.

According to one embodiment, in order to achieve Diameter spooling for diameter session based applications, the Diameter proxy treats each transaction in the event based model, described in detail above with reference to FIGS. 4A-4C. That is, the determination if the ACR STRAT messages should be queued is based on the spooling threshold, and decision to which queue (320 or 330) the messages should be saved to is based on the state of the short-term queue 320. According to this embodiment, all messages related to the same charging session are queued in the same queue. For example, if the ACR START message is queued in the short-term queue 320, all subsequent messages related the session started by the ACR STRAT are queued in the queue 320. Once the ACR START message is removed from the queue 320, all subsequent messages related to the charging session are sent directly to the Diameter server 220. In addition, all queued messages of a charging session that are in the short-term queue 320 at the time of the ACT START message removed from the queue 320 are also removed from the queue 320 and sent to the Diameter server 220. Messages of session-based charging queued in the long-term queue 330 are handled in the same manner.

Figure 5:
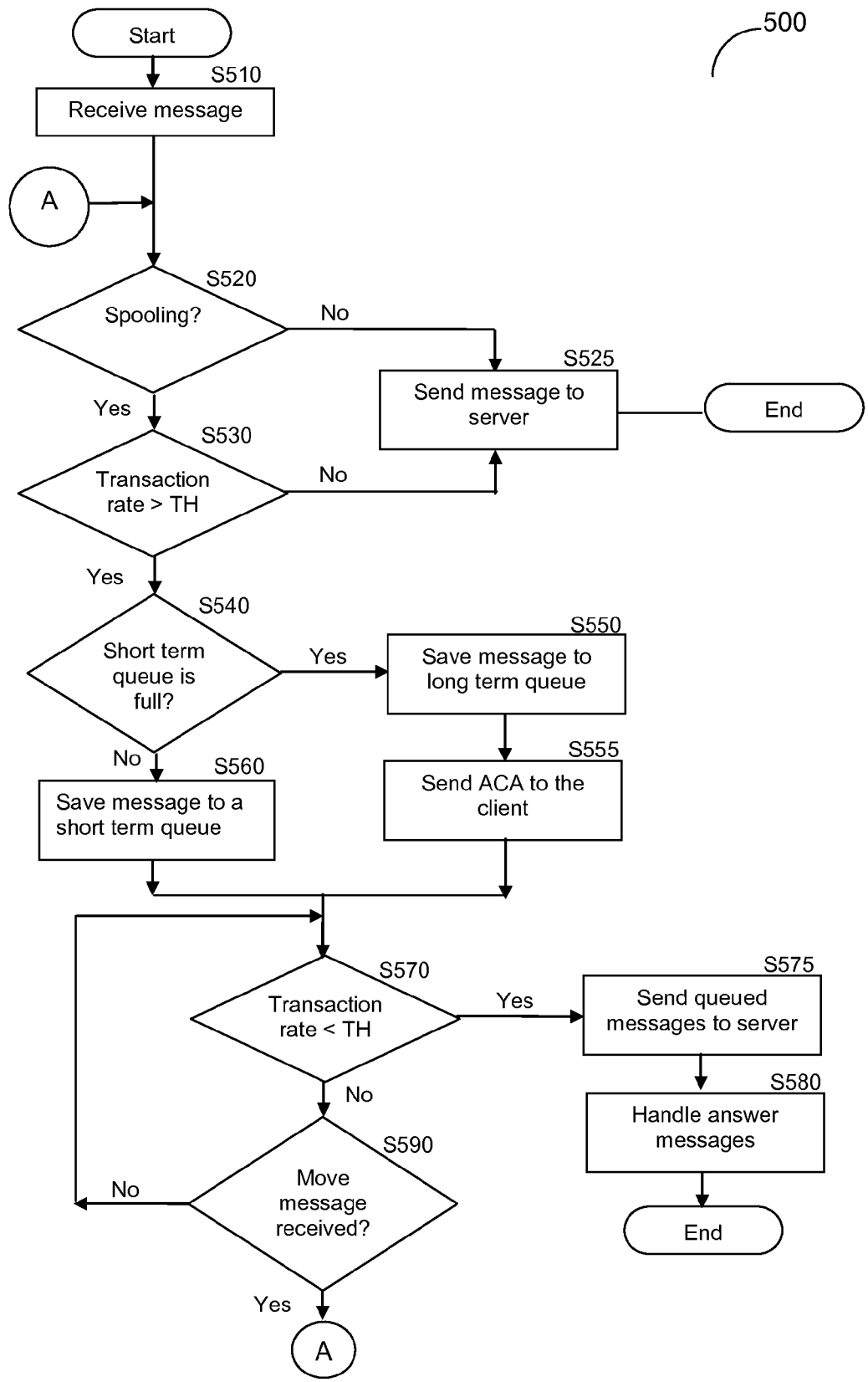
FIG. 5 is a flowchart describing the method for spooling Diameter messages according to one embodiment disclosed herein.

FIG. 5 is an exemplary and non-limiting flowchart 500 illustrating a method for spooling Diameter messages according to one embodiment. The method is performed by the Diameter proxy 200. At S510, a Diameter message is received at the proxy 200. At S520, it is check if the received message is initiated by an application that requires message spooling. Examples for such application may be a non real-time application (e.g., changing application), and application that can tolerate delayed answers from the Diameter server 220, and so on. If S520 results with a Yes answer, execution proceeds to S530; otherwise, at S525, the received message is relayed to the Diameter server 220.

At S530, a counter 310 of the proxy is compared to the spooling threshold (TH), to determine if the current transaction rate exceeds the threshold value. If the transaction rate does not exceed the spooling threshold, then at S525 the received message is relayed to the Diameter server 220. Otherwise, at S540, another check is made to determine if the short-term queue 320 is full, and if so, at S550, the received message is stored in the long-term queue 330. At S555, an answer message respective of the message saved in the long-term queue 336 is generated by the proxy 200 and sent to the Diameter client 210. If the short-term queue 320 has some vacancy, then, at S560, the received message is saved in the queue 320. It should be noted that when a message is saved in the queues 320 and 330, its ID and type are maintained by the proxy 200.

At S570 it is determined if the transmission rate (as measured by the counter 310) falls below the spooling threshold. Such determination may be performed constantly or periodically. If so, at S575, the queued messages are sent to the Diameter server 220. It should be noted that messages queued in the long-term queue are first moved to the short-term queue 320, and then are sent to the server 220, for example, according to their order in the queue 320. At S580, any answer received from the server 220 is either sent to the client 210 or dropped. As noted above, answers that are sent in response to request messages handled by the proxy 200 are dropped.

Figure 6:
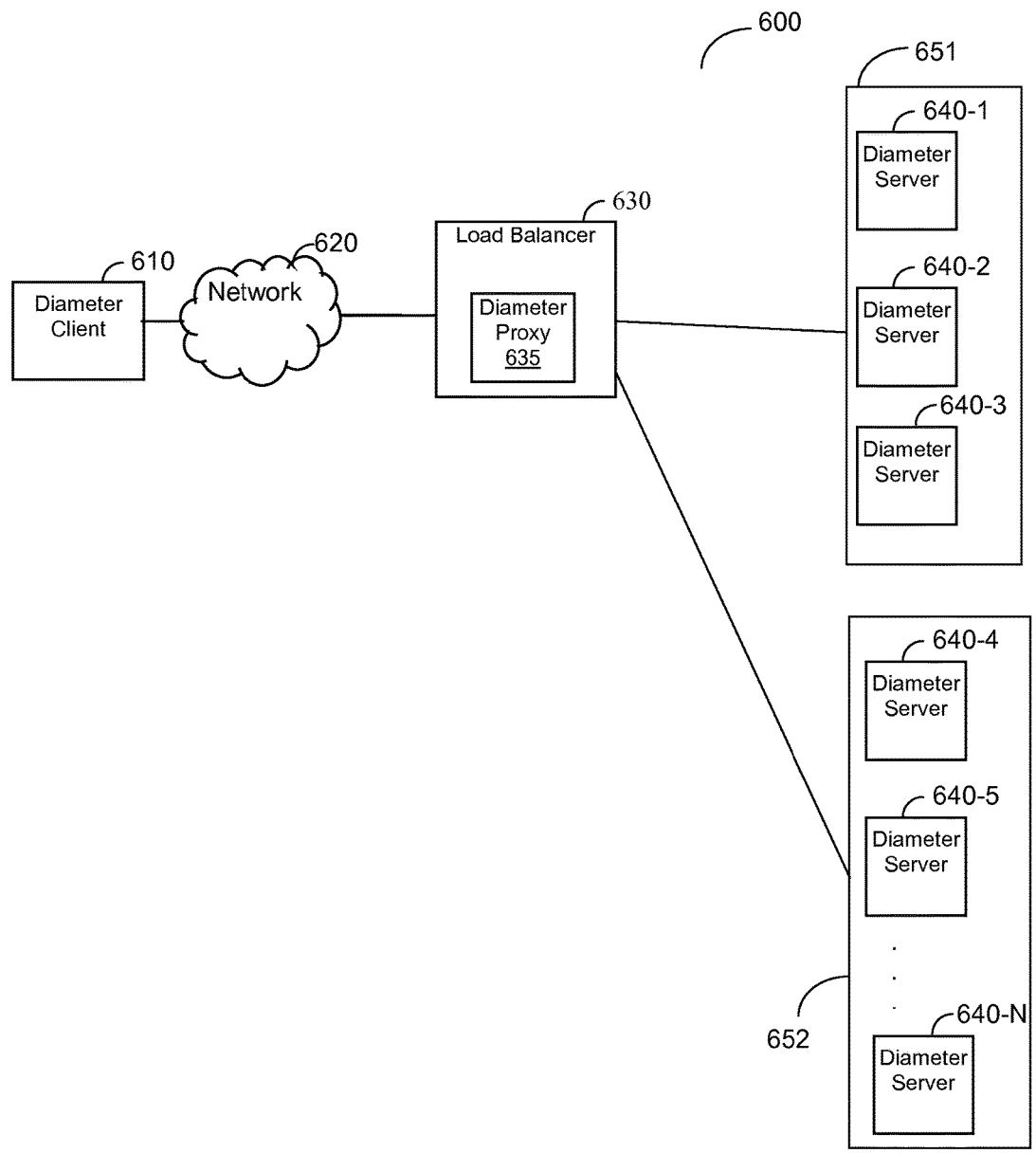
FIG. 6 illustrates the deployment of the Diameter proxy network system that includes a cluster of Diameter servers according to an embodiment disclosed herein.

At S590, it is checked if the more messages have been received from the client 210, and if so, execution returns to S520; otherwise, execution waits at S570. FIG. 6 illustrates the deployment of the Diameter proxy 200 in an authentication, authorization and accounting (AAA) network system 600 according to one embodiment. The AAA network system 600 includes at least one Diameter client 610, a network 620, a load balancer 630 that includes the Diameter proxy 635, and a cluster of a plurality of Diameter servers 640-1, 640-N connected in two computing farms 651 and 652. The Diameter servers 640 may be virtual or physical servers. The load balancer 630 communicates with both the Diameter client 610 and Diameter servers 640 through the network 620 which supports data transfer using a transport protocol including, but not limited to, a transmission control protocol (TCP), a stream control transmission protocol (SCTP), and the like. The network 620 may be, but is not limited to, a local area network (LAN), a wide area network (WAN), a metropolitan area network (MAN), or any combination thereof. The load balancer 630 may be a virtual or physical appliance, such as an application delivery controller (vADC).

The Diameter client 610 sends request messages to one or more of the Diameter servers 640 through the Diameter proxy 200 and the load balancer 630. The Diameter servers 640 perform authentication, authorization, and/or accounting functions according to requests generated by the DIAMETER client 610.

The Diameter proxy 635 spools Diameter request messages sent from the client 610 as discussed in greater detail above. That is, in the system 600, spooled Diameter messages can be also load balanced over the servers 640 and or the farms 651, 652. In one embodiment, the load balancing function includes, but is not limited to, management of TCP connections, sessions and Diameter connections, and distributes Diameter request messages, processed by the Diameter proxy 635, to the Diameter servers 640 according to a predefined load balancing algorithm.

Figure 7:
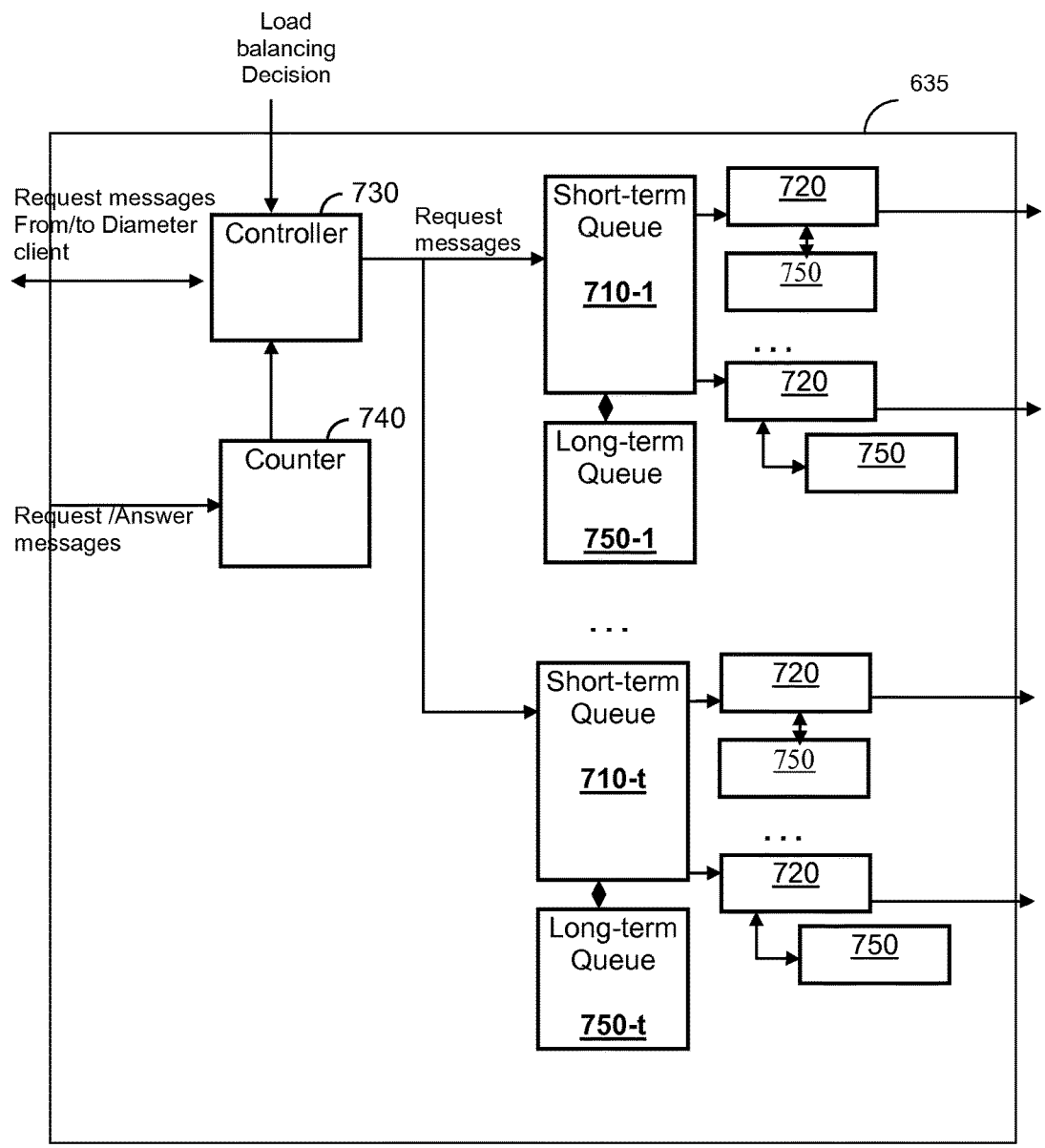
FIG. 7 is a block diagram of a Diameter proxy integrated in a load balancer according to one embodiment disclosed herein.

In a preferred embodiment, the Diameter proxy 635 implements a hierarchy of short-term queues, as shown in the exemplary and non-limiting FIG. 7. A first group of short-term queues 710-1, . . . , 710-$t$ correspond to a frame in the network (e.g., farm 651). Each queue 710 of the first group of short-term queues is connected to a second group of short-term queues 720 correspond to servers connected in the respective farm. For example, the second group of short-term queues 720-1 through 720-3 correspond to the servers 640-1 through 640-3 in the farm 651. The Diameter proxy 635 also includes a controller 730, a counter 740, and a plurality of long long-term queues, collectively label 750. Each short-term queue 710 or 720 is connected to a respective long-term queue 750. According to this embodiment, the controller 730 receives an input from a load balancing module in the load balancer 630 indicating to which of the short-term queues 710, 720 an incoming Diameter message should be placed. As each short-term queue 710, 720 corresponds to either a farm or a server in the farm, the decision to which queue to place the message may be based on one or more of the following considerations: connection persistency, load of servers and/or farms, layer-7 parameters (e.g., realm, application ID, etc.), and so on. The load can be balanced according to a balancing algorithm including, but not limited to, a round robin, a weighted round robin, weighted sessions (i.e., weighted according to the number of active sessions each server has with a client, weighted requests (i.e., weighted according to the number of current messages queued in each short-term queue), and so on. The connection persistency ensures that all messages belong to the same connection with a server would be placed in the short-term queue. Thus, when the server falls, all messages can be queued in a short-term queue corresponding to a "backup" server of the failed server.

In one embodiment, the Diameter proxy can be integrated in the load balancer 630. That is, the load balancer 630 is designed to include the short-term and long-term queues as well the transaction counter (e.g., counter 310). In another embodiment, the Diameter proxy is configured to perform the functions of the load balancer 630.

It should be noted that the Diameter proxy discussed herein can be implemented to include one queue type. That is, in a specific implementation the Diameter proxy may include one or more long-term queues.

The foregoing detailed description has set forth a few of the many forms that the present invention can take. It is intended that the foregoing detailed description be understood as an illustration of selected forms that the invention can take and not as a limitation to the definition of the invention. It is only the claims, including all equivalents thereof, that are intended to define the scope of this invention.

Most preferably, the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A method for spooling Diameter transactions, comprising:
receiving, by a Diameter proxy from a Diameter client, a Diameter request message;
determining, by a Diameter proxy based at least on a type of the received Diameter request message as indicated by its command code, whether the received Diameter request message is permitted to be spooled in that it need not be processed immediately in real-time as received;
when it is determined that the received Diameter request message is a type that is not permitted to be spooled, processing the message in real-time as received;
when it is determined that the received Diameter request message is a type that is permitted to be spooled, determining whether a current transaction rate exceeds a predefined spooling threshold; and
when it is determined that the current transaction rate exceeds the spooling threshold, spooling the received Diameter request message so that it is not processed in real-time, wherein the spooling includes queuing the received Diameter request message in any one of: a short-term queue and a long-term queue.

2. The method of claim 1, further comprising:
periodically comparing a current transaction rate to the spooling threshold; and
sending the spooled Diameter request message to a Diameter server based upon the periodic comparison of the current transaction rate to the spooling threshold.

3. The method of claim 2, wherein spooling the received Diameter request message further comprises:
determining whether the received Diameter request message is permitted to be queued in the short-term queue;
queuing the received Diameter request message in the short-term queue when the determination is that the received Diameter request message is permitted to be queued in the short-term queue; and
queuing the received Diameter request message in the long-term queue when the determination is that the received Diameter request message is not permitted to be queued in the short-term queue.

4. The method of claim 3, wherein queuing the received Diameter request message in the long-term queue further comprises:
generating a Diameter answer message on behalf of the Diameter server; and
sending the Diameter answer message to the Diameter client.

5. The method of claim 3, further comprising:
receiving a Diameter answer message in response to the Diameter request message sent to the Diameter server, wherein the Diameter answer message is generated by the Diameter server;
forwarding the received Diameter answer message to the Diameter client, when the Diameter answer message is generated in response to a Diameter request message queued in the short-term queue; and
dropping the received Diameter answer message, when the Diameter answer message is generated in response to a Diameter request message that has been queued in the long-term queue.

6. The method of claim 3, wherein sending the queued Diameter request message to the Diameter server, further comprises :
moving a Diameter request message queued in the long-term queue to the short-term queue; and
sending the Diameter request message to the Diameter server from the short-term queue.

7. The method of claim 3, wherein the determination as to whether the received Diameter request message is permitted to be queued in the short-term queue is based on at least one of: current occupancy of the short-term queue, a type of the received Diameter request message, contents of an event record of the received Diameter request message, and a destination Diameter sever.

8. The method of claim 3, wherein the short-term queue is a random access memory and the long-term queue is a storage device, wherein the storage capacity of the short-term queue is greater than the storage capacity of the long-term queue.

9. The method of claim 1, wherein determining whether the received Diameter request message is permitted be spooled further comprises:
determining whether the type of the received Diameter request message is a non real-time application requesting a Diameter service, wherein a charging application is one type of non real-time application.

10. The method of claim 9, wherein Diameter request messages received during a charging session are spooled.

11. The method of claim 1, further comprising:
forwarding the received Diameter request message to the Diameter server when it is determined that the received Diameter request message is not permitted to be spooled or when the current transaction rate does not exceed the predefined spooling threshold.

12. The method of claim 1, wherein instructions for causing one or more processing units of the Diameter proxy to execute the method are stored on a non-transitory computer readable medium.

13. A Diameter proxy for spooling Diameter transactions, comprising:
a counter for measuring a current transaction rate;
a short-term queue;
a long-term queue;
a controller: and
a memory, the memory containing instructions that, when executed by the controller, configures the Diameter proxy to:
receive from a Diameter client a Diameter request message,
determine, based at least on a type of the received Diameter request message as indicated by its command code, whether the received Diameter request message is permitted to be spooled in that it need not be processed immediately in real-time as received,
when it is determined that the received Diameter request message is a type that is not permitted to be spooled, processing the message in real-time as received,
when it is determined that the received Diameter request message is a type that is permitted to be spooled, compare a value of the counter against a spooling threshold, and
spool the received Diameter request message by queuing the received Diameter request message in one of the short-time queue or the long-term queue based upon the result of the comparison so that it is not processed in real-time, wherein the spooling includes queuing the received Diameter request message in any one of: the short-term queue and the long-term queue.

14. The Diameter proxy of claim 13, wherein the controller is further configured to periodically compare a current transaction rate to the spooling threshold, and to send the queued Diameter message to a Diameter server when the current transaction rate falls below the spooling threshold.

15. The Diameter proxy of claim 14, wherein the controller is further configured to:
determine whether the received Diameter request message should be queued in the short-term queue;
queue the received Diameter request message in the short-term queue when the determination is that the received Diameter request message should be queued in the short-term queue based upon the check of the value of the counter against the spooling threshold; and
queue the received Diameter request message in the long-term queue when determined that the received Diameter request message should not be queued in the short-term queue based upon the check of the value of the counter against the spooling threshold.

16. The Diameter proxy of claim 15, wherein the controller is further configured to:
generate a Diameter answer message on behalf of the Diameter server for each Diameter request message queued in the long-term queue; and
send the Diameter answer message toward the Diameter client.

17. The Diameter proxy of claim 15, wherein the controller is further configured to:
receive a Diameter answer message responsive to the Diameter request message sent to the Diameter server, wherein the Diameter answer message is generated by the Diameter server;
forward the received Diameter answer message to the Diameter client when the Diameter answer message is generated in response to a Diameter request message queued in the short-term queue; and
drop the received Diameter answer message when the Diameter answer message is generated in response to a Diameter request message queued in the long-term queue.

18. The Diameter proxy of claim 15, wherein the controller is further configured to:
move a Diameter request message queued in the long-term queue to the short-term queue; and
send the Diameter request message toward the Diameter server from the short-term queue to the Diameter server.

19. The Diameter proxy of claim 15, wherein the determination as to whether the received Diameter request message should be queued in the short-term queue is based on at least one of: current occupancy of the short-term queue, a type of the received Diameter request message, contents of an event record of the received Diameter request message, and a destination Diameter sever.

20. The Diameter proxy of claim 13, wherein the short-term queue is at least a random access memory and the long-term queue is at least a storage device, wherein the storage capacity of the short-term queue is greater than the storage capacity of the long-term queue.

21. The Diameter proxy of claim 13, wherein the controller determines that spooling is required when a type of the received request message is of a non real-time application requesting a Diameter service, wherein the non real-time application includes at least a charging application.

22. The Diameter proxy of claim 13, is further configured to spool a Diameter transaction received during a charging session.

23. The Diameter proxy of claim 22, wherein the controller is further configured to forward the received request message toward the Diameter server when it is determined that the received Diameter request message should not be spooled or when the current transaction rate does not exceed the spooling threshold.

24. The Diameter proxy of claim 22, wherein the Diameter proxy is integrated in any one of a virtual load balancing appliance and a physical load balancing appliance.

25. An authentication, authorization and accounting (AAA) system, comprising:
at least one cluster of Diameter servers, wherein each Diameter server is configured to perform authentication, authorization and accounting functions according to Diameter request messages received from a Diameter client; and
a load balancer including a Diameter proxy and configured to distribute Diameter request messages among a plurality of Diameter servers in the cluster of Diameter servers, wherein the Diameter proxy is configured to spool Diameter transactions exchanged between the at least one cluster of Diameter servers and the Diameter client, the Diameter proxy includes a processing circuity and a memory, the memory containing instructions that, when executed by the processor, configures the Diameter proxy to:

determine, based in part on a type of a received Diameter request message as indicated by its command code, whether the received request message is permitted to be spooled in that it need not be processed immediately in real-time as received, when it is determined that the received Diameter request message is a type that is not permitted to be spooled, processing the message in real-time as received, when it is determined that the received Diameter request message is a type that is permitted to be spooled, determine whether a current transaction rate exceeds a predefined spooling threshold, and when it is determined that the current transaction rate exceeds the spooling threshold, spooling the received Diameter request message so that it is not processed in real-time, wherein the spooling includes queuing the received Diameter request message in any one of: a short-term queue and a long-term queue.

26. The AAA system of claim 25, wherein the Diameter proxy comprises a plurality of short-term queues, each of the plurality of short-term queues corresponding to a Diameter server in the at least one cluster of Diameter servers.

27. The AAA system of claim 26, wherein the Diameter proxy comprises at least one short-term queue that corresponds to the at least one cluster, wherein the at least one cluster of Diameter servers is any one of: a computing farm and a datacenter.

28. The AAA system of claim 27, wherein Diameter transactions are queued in the plurality of short-term queues based on at least one of: a connection persistency, load of Diameter servers in the cluster of Diameter servers, and layer-7 parameters.

* * * * *